(12) United States Patent
Kalcevic et al.

(10) Patent No.: US 9,074,766 B2
(45) Date of Patent: Jul. 7, 2015

(54) COMBUSTION METHOD AND SYSTEM

(75) Inventors: Robert Kalcevic, Versailles (FR); Jacky Laurent, Saint-Cyr l'Ecole (FR); Bertrand Leroux, Linas (FR); Remi Tsiava, Saint Germain-les-Corbeil (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 1282 days.

(21) Appl. No.: 12/743,707

(22) PCT Filed: Nov. 21, 2008

(86) PCT No.: PCT/FR2008/052097
§ 371 (c)(1),
(2), (4) Date: May 19, 2010

(87) PCT Pub. No.: WO2009/071811
PCT Pub. Date: Jun. 11, 2009

(65) Prior Publication Data
US 2010/0310996 A1    Dec. 9, 2010

(30) Foreign Application Priority Data

Nov. 23, 2007 (FR) .................................. 07 59283

(51) Int. Cl.
*C03B 5/435* (2006.01)
*F23D 14/32* (2006.01)
*C03B 7/06* (2006.01)
*F23M 5/02* (2006.01)

(52) U.S. Cl.
CPC ................ *F23D 14/32* (2013.01); *C03B 7/065* (2013.01); *F23M 5/025* (2013.01); *F23M 2900/05021* (2013.01); *Y02E 20/344* (2013.01)

(58) Field of Classification Search
CPC ...... C03B 7/065; C03B 5/2353; C03B 5/435; F23D 14/32; F23M 5/025
USPC ....... 431/2, 7, 8, 189, 159, 350; 126/343.5 R; 110/336; 65/134.1, 136.3, 347
See application file for complete search history.

(56) References Cited

U.S. PATENT DOCUMENTS 2,144,973 A * 1/1939 Honiss .......................... 65/137
2,649,903 A * 8/1953 Russell ........................ 431/178
(Continued)

FOREIGN PATENT DOCUMENTS

DE      10 2005 005 735           8/2006
FR       2 735 122                12/1996
WO      WO 2007007012 A2 *        1/2007

OTHER PUBLICATIONS

PCT/FR2008/052097 International Search Report.

*Primary Examiner* — Avinash Savani
(74) *Attorney, Agent, or Firm* — Christopher J. Cronin (57) ABSTRACT

The invention relates to a method for heating a material in a zone heated by combustion of a fuel with an oxidant by means of a oxyburner comprising an injector arranged within a block defining a chamber with a confinement index Iconf=(S/S')× (L/L')×(1/(1+a/100))=0.10; the fuel being injected into the burner chamber with a rate IF and the oxidant being injected into the burner chamber at a rate Iox such that 0.7=IF=3.6 et 0.3=Iox=5.1, provided that when Iox>3.8 then IF=3.3.

18 Claims, 4 Drawing Sheets

(56) References Cited

U.S. PATENT DOCUMENTS

| | | | |
|---|---|---|---|
| 2,863,498 A * | 12/1958 | Rogers et al. | 431/279 |
| 4,294,603 A * | 10/1981 | Winzer et al. | 65/346 |
| 4,494,974 A * | 1/1985 | Vilk et al. | 65/337 |
| 4,511,385 A * | 4/1985 | Barkhau et al. | 65/135.1 |
| 4,708,728 A * | 11/1987 | Desprez et al. | 65/134.4 |
| 4,750,928 A * | 6/1988 | Bolin et al. | 65/346 |
| 5,169,424 A * | 12/1992 | Grinnen et al. | 65/346 |
| 5,500,030 A * | 3/1996 | Joshi et al. | 65/346 |
| 5,560,758 A * | 10/1996 | Brown et al. | 65/134.4 |
| 5,814,121 A * | 9/1998 | Travis | 65/346 |
| 6,029,910 A | 2/2000 | Joshi et al. | |
| 6,203,314 B1 * | 3/2001 | Philippe et al. | 432/19 |
| 6,233,974 B1 * | 5/2001 | Anderson et al. | 65/134.4 |
| 6,431,467 B1 * | 8/2002 | Joshi et al. | 239/404 |
| 2003/0134241 A1 * | 7/2003 | Marin et al. | 431/9 |

\* cited by examiner

COMBUSTION METHOD AND SYSTEM

CROSS-REFERENCE TO RELATED APPLICATIONS

This application is a §371 of International PCT Application PCT/FR2008/052097, filed Nov. 21, 2008.

BACKGROUND

1. Field of the Invention

The present invention relates to a method for using oxycombustion to heat a substance present in a heating zone, such as the distribution canals or forehearths particularly those used for conditioning glass.

The burners are commonly used as a heating system for heating a substance present in a heating zone.

In this context, the term heating covers not only the addition of energy to a substance in order to increase its temperature, but also methods of supplying energy with a view to maintaining or controlling the temperature of this substance, for example in order to obtain or maintain a more homogeneous temperature through the substance.

2. Related Art

A burner is a device used to combine a fuel and an oxidant with a view to burning them. The fuel and the oxidant are usually carried to the heating zone through the burner from outside the enclosure defining the heating zone.

Air is the oxidant traditionally used. Burning using air as an oxidant is known as air combustion.

In order to increase the energy efficiency of the burners and reduce the amount of pollutants, notably of $NO_x$, produced, the air as an oxidant may advantageously be replaced with oxygen-enriched air or with more or less pure oxygen. Combustion is then known as oxycombustion and the corresponding burners are oxyburners.

This change in oxidant has the effect of altering the characteristics of the combustion and especially those of the flame.

When changing from air combustion to oxycombustion the flame temperature becomes higher. The radiative heat transfer becomes more intense and occurs in part in a different range of wavelengths. All of these factors play a part in improving the heat transfer between the flame and the substance that is to be heated.

Depending on the target application, the burners are chosen according to their power and/or according to the shape of their flame.

For example, in the case of a melting furnace, the burner or burners provide the solid charge with the heating and melting energy needed for melting. For such an application, use is therefore generally made of high-power burners the flames of which are able to cover a significant proportion, if not all, of the free surface of the substance that is to be melted in the relevant zone of the furnace.

In the case of the distribution canals which transport the molten substance from the melting furnace to the installations downstream, such as shaping machines in particular, the burner or burners supply the energy necessary such that on entering the downstream (shaping) installation, the molten substance has homogeneous properties such as temperature, viscosity, etc. suited to its treatment in the downstream installation. The distribution canal may in particular be equipped with burners aimed at compensating for heat losses through the walls of the canals so as to reduce the heterogeneity, notably in terms of the temperature of the molten substance in the transverse section of the distribution canals. The burners of the distribution canals are then, as a general rule, low-power burners the flame of which is limited to a zone near the walls of the canal.

What is more, in the case of a flame in a distribution canal which extends beyond the zone near the walls of the canal and which therefore also heats the molten material in the central zone of the canal there is a substantial risk of reboiling the molten material in this zone and therefore of having an end product that exhibits inhomogeneities and corresponding defects.

The power of a burner and the shape of the flame obtained are essentially dependent on the concept or design of the burner and on the nature and flow rates of fuel and oxidant.

The injector (or tip) of an oxyburner is generally made of metal (steel or refractory steel for example) and is often positioned inside a refractory port block.

For industrial applications, the durability and reliability and the performance in terms of energy consumption are particularly important properties for a burner.

Furthermore, it is desirable to be able to use one and the same burner or one and the same type of burner at different powers according to the technical characteristics of the method in which the burner or burners are used and/or to be able to take account of the ageing of the chamber defining the heating zone.

In practice, it is found that the high temperatures encountered during the oxycombustion heating method limit the durability (life) of the burner when the burner is not used correctly.

For example, an excessive increase in the temperature of the burner tip may lead to rapid degradation thereof requiring the burner to be taken out of service. To limit this risk, the tip of the burner is generally set back in the port block.

However, this configuration may also have the effect of very significantly increasing the temperature of the port block and of forming hot spots in the block and/or of causing the block to melt in places such that the port block and the burner both have to be taken out of service.

Another problem encountered with this type of burner is a lack of reliability or of consistent performance in terms of energy consumption which is due to the formation of deposits.

What happens is that the formation of soot, with carbon deposited on the fuel injector, is often accompanied by a change in the position of the flame given the change to the centering and/or the geometry of the flame; and therefore by a modification in the effectiveness of the heating method.

Moreover, such a modification in the position of the flame caused by soot forming on the tip of the burner may also lead to an overheated or melted zone on the block and therefore limit the durability of the block and sometimes also of the burner.

Finally, volatile substances from the heating zone may be deposited in the block or on the tip of the burner. A substantial build-up of volatile substances in the block/on the tip may also deflect the flame which, as explained previously in the case of carbon deposits, reduces the reliability of the burner and possibly also even its durability.

It is an object of the present invention to address the aforementioned disadvantages of burners by means of a heating method and system that are optimized and can be used for heating a molten substance in distribution canals.

DE-A-102005005735 describes a method for heating an industrial furnace by means of a burner of tube-in-tube type. The burner has a central fuel injector surrounded by an annular gaseous-oxidant injector, and a cylindrical chamber known as the mixing and combustion chamber between the injectors and the outlet opening of the burner. The combustion which begins in the cylindrical chamber (precombustion) is delayed because of similar impulse densities of the fuel and of the oxidant. The limited internal volume of the burner chamber, its cylindrical shape and its diameter which is close to the diameter of the outer pipe of the burner limits the degree of precombustion in the chamber and prevents turbulence and recirculation of the gases in the chamber as occurs with conical burner chambers. A high total impulse of the oxidant and of the fuel leaving the burner and the selection of the power density at the outlet from the burner mean that a substantial amount of flue gases from the furnace is sucked into the reaction zone of the flame, lowering the flame temperature and reducing the formation of $NO_x$ and of CO. The result is uniform heating of the charge in the furnace. The method according to DE-A-102005005735 is therefore particularly well suited to melting furnaces such as glass melting furnaces.

However, this method is not very well suited to applications in distribution canals where, as mentioned previously, heating located only near the walls is desired.

SUMMARY OF THE INVENTION

There is disclosed a method for heating a substance present in a heating zone by burning a fuel with an oxidant by means of a burner comprising an injector positioned inside a block, the injector being mounted in the inlet passage as far as the outlet end of the inlet passage directly upstream of the chamber, characterized in that:

the oxidant has an oxygen content 50 vol %,
the chamber has a confinement index $I_{conf} \geq 0.10$ with $I_{conf} = (S/S') \times (L/L') \times (1/(1+\alpha/100))$, L' being the longest length of the downstream cone, L being the shortest length of the downstream cone, S being the smallest cross section of the downstream cone, S being the cross section of the downstream cone at its shortest length L, and a being the cone angle of the downstream cone,
a ranges from 1° to 16°,
the fuel is injected by the injector into the burner chamber with an impulse $I_F$ at the outlet of the injector and the oxidant is injected by the injector into the chamber of the burner with an impulse $I_{ox}$ at the output of the injector such that $0.7 \leq I_F \leq 3.6$ and $0.3 \leq I_{ox} \leq 5.1$, provided that when $I_{ox} > 3.8$ then $I_F \leq 3.3$.

The method may include any one or more of the following aspects:
$I_F \geq 1.8$.
$2.3 \leq I_F \leq 3.3$ and $1.8 \leq I_{ox} \leq 3.8$.
$I_{conf} \leq 0.35$.
$I_{conf} \leq 0.15$, $L' \leq (1/0.8) \times FM(I_F, I_{ox})$,
$0.25 \leq I_{con}s$, $L' \leq (1/0.8) \times Fm(I_F, I_{ox})$, and
$0.15 \leq I_{conf} \leq 0.25$, $L' \leq (1/0.8) \times \{FM(I_F, I_{ox}) - 10 \times (I_{conf} - 0.15) \times [FM(I_F, I_{ox}) - Fm(I_F, I_{ox})]\}$, with: $FM(I_F, I_{ox}) = 0.6$, and $Fm(I_F, I_{ox}) = 0.45$.
$I_{conf} \leq 0.15$, $L' \leq (1/0.9) \times FM(I_F, I_{ox})$
$0.25 \leq I_{conf}$, $L' \leq (1/0.9) \times Fm(I_F, I_{ox})$, and
$0.15 \leq I_{conf} \leq 0.25$, $L' \leq (1/0.9) \times \{FM(I_F, I_{ox}) - 10 \times (I_{conf} - 0.15) \times [FM(I_F, I_{ox}) - Fm(I_F, I_{ox})]\}$.
$I_{conf} \leq 0.15$, $L' \leq FM(I_F, I_{ox})$,
$0.25 \leq I_{conf}$, $L' \leq Fm(I_F, I_{ox})$, and
$0.15 \leq I_{conf} \leq 0.25$, $L' \leq FM(I_F, I_{ox}) - 10 \times (I_{conf} - 0.15) \times [FM(I_F, I_{ox}) - Fm(I_F, I_{ox})]$.
the oxygen content of the oxidant is greater than or equal to 70 vol %, preferably greater than or equal to 80 vol % and more preferably still, greater than or equal to 87 vol %.
the burner is a tube-in-tube burner.
the burner has a power of 0.1 to 500 kW.
the burner comprises means for causing the oxidant and/or the fuel to rotate as it leaves the injector.
the substance to be heated is molten matter, preferably molten glass.
the heating zone is situated inside a distribution canal, and preferably inside a glass distribution canal or forehearth.
the fuel is a gaseous fuel, preferably chosen from natural gas, methane, propane and butane.
$L' \leq 0.4$ m, preferably $L' \leq 0.3$ m.

BRIEF DESCRIPTION OF THE FIGURES

The invention is described hereinafter with reference to FIGS. 1 to 6, in which.

DETAILED DESCRIPTION OF THE INVENTION

The present invention relates to a method for heating a substance present in a heating zone and doing so by burning a fuel with an oxidant by means of a burner which comprises an injector positioned inside a block.

Because the combustion is oxycombustion, the oxidant has an oxygen content greater than 21 vol % and more specifically greater than or equal to 50 vol %.

The block defines an inlet passage and a burner chamber. Said inlet passage has an inlet end and an outlet end. The inlet passage opens via its outlet end into the chamber of the block.

Said chamber in the block has a downstream cone and opens via this downstream cone into the heating zone in which the substance that is to be heated lies.

The burner injector is mounted in the inlet passage as far as the outlet end of the inlet passage directly upstream of the chamber. Thus, the oxidant and the fuel carried through the injector enter the block via the inlet end of the inlet passage and leave the injector at the outlet end of said passage so as to be injected into the chamber of the block.

According to the invention, the chamber of the block has a confinement index $I_{conf} \geq 0.10$. This confinement index $I_{conf}$ satisfies the following formula:

$$I_{conf} = (S/S') \times (L/L') \times (1/(1+\alpha/100)),$$

in which:

"L'" is the longest length of the downstream cone, expressed in m,

"L" is the shortest length of the downstream cone, expressed in m,

"S" is the smallest cross section of the downstream cone, expressed in $m^2$,

"S'" is the cross section of the downstream cone at its shortest length L, expressed in $m^2$, "α" is the cone angle of the downstream cone, expressed in ° (degrees).

Figure 3:
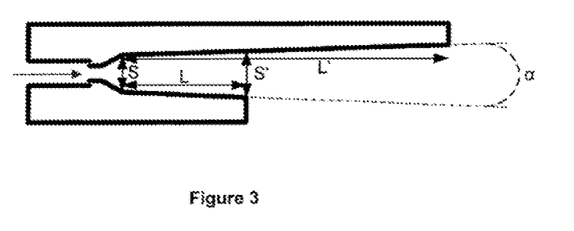
FIG. 3 is a schematic depiction of a block indicating the parameters used for calculating the operating index, which index is explained later in this document.

The various parameters L', L, S, S' and α are depicted in FIG. 3.

The confinement index indicates the degree of confinement of the flame within the block. The higher the value of the index, the more confined the flame will be inside the chamber of the block.

The angle α is from 1° to 16°.

Also according to the invention, the fuel is injected by the injector into the chamber of the block with an impulse $I_F$ at the outlet from the injector and the oxidant is injected into the chamber of the block by the injector with an impulse $I_{ox}$ at the outlet of the injector such that $0.7 \leq I_F \leq 3.6$ and $0.3 \leq I_{ox} \leq 5.1$, provided that when $I_{ox} > 3.8$ then $I_F \leq 3.3$.

Advantageously, $I_F \geq 1.8$.

For preference, when $I_{ox} < 1.1$, then $I_F \geq 2.2$, and when $I_{ox} > 4.3$, then $I_F \geq 2.0$.

In this context, the impulse (expressed in miliNewtons: mN) of a fluid leaving the injector is defined as by the formula $I = Q_m \times V_s$, in which:

$Q_m$ is the mass flow rate of the fluid in question through the injector, and $V_s$ is the velocity of said fluid in the outlet section of the injector.

It will be noted that, for a mass flow rate $Q_m$ and a given supply pressure, the velocity $V_s$, and therefore also the impulse I, of the fluid will be dependent on the cross section through which the fluid leaves the burner injector.

Figure 4:
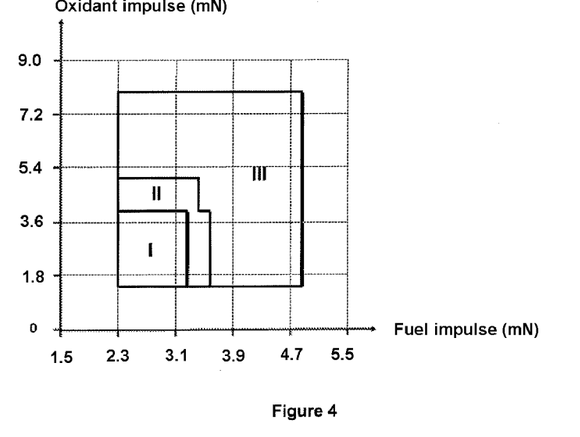
FIG. 4 depicts the operating chart of a burner according to the invention as a function of the fuel impulse $I_F$ and of the oxidant impulse $I_{ox}$.
Figure 5:
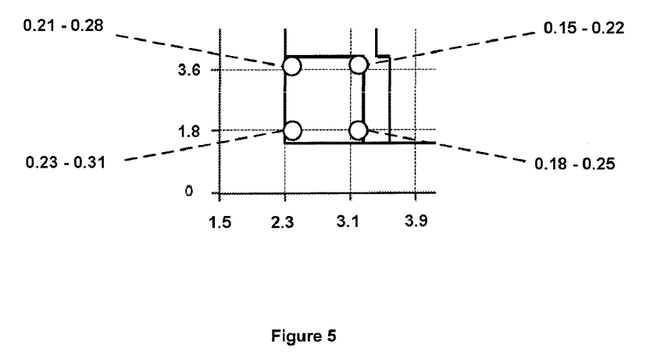
FIG. 5 is an enlarged view of FIG. 4 in zone I; the values of FM and Fm, which will be explained later in this document, are given for various combinations of oxidant and fuel impulses.

The abovementioned ranges for the impulse of the fuel $I_F$ and for the impulse of the oxidant $I_{ox}$ leaving the injector correspond to zones I and II in FIG. 4.

According to one preferred embodiment of the invention, $2.3 \leq I_F \leq 3.3$ and $1.8 \leq I_{ox} \leq 3.8$, which corresponds to zone I in FIG. 4.

The invention thus makes it possible to improve the durability and reliability of the block and of the burner and the energy performance of the burner or, in the case of a retrofit, allows an existing burner to be replaced with a more durable and more reliable and more energy-efficient burner (or alternatively allows the injector of an existing burner to be replaced so as to obtain a burner that is more durable and reliable). What happens is that retrofitting imposes additional conditions because it involves applying the method to existing installations and the operators of these installations, and notably of glassworks, are generally more in favor of changing only the injectors rather than changing also the refractory blocks, or even other parts of the heating zone, given the substantial financial outlay that that would represent.

In FIG. 4, zone III corresponds to:

a combination of high fuel impulse and high oxidant impulse, or a combination of high impulse of one of the reagents and far lower impulse of the other reagent.

Operating the burner under these conditions carries a high risk of an increase in temperature of the tip of the burner and especially a risk of the formation of soot (deposit of carbon) on the burner tip and of damage to the port block.

On the other hand, zone I is the zone to be preferred and corresponds to a combination of relatively low fuel impulse and relatively low oxidant impulse.

Operating the burner under these conditions has the effect of producing a flame which in relative terms is longer but is still significantly confined in the chamber of the block, allowing better energy transfer to the substance to be heated on leaving the block, but still near to said block. The risk of soot forming on the burner tip or of damage to the block is significantly reduced by comparison with operating a burner in zone III.

Finally, zone II corresponds to intermediate operation; the risk of burner tip damage and of block damage is lower by comparison with zone III, but higher than in preferred zone I.

For various applications, the confinement index $I_{conf}$ is usefully lower than or equal to 0.35.

For even better optimized burner energy performance, reliability and durability, the maximum length of the cone must not exceed a maximum value which is dependent on the impulses of the oxidant and of the fuel.

Thus, according to one advantageous embodiment of the invention:

when $I_{conf} \leq 0.15$, $L' \leq (1/0.8) \times FM(I_F, I_{ox})$, when $0.25 \leq I_{conf}$, $L' \leq (1/0.8) \times Fm(I_F, I_{ox})$, and when $0.15 \leq I_{conf} \leq 0.25$, $L' \leq (1/0.8) \times \{FM(I_F, I_{OX}) - 10 \times (I_{conf} - 0.15) \times [FM(I_F, I_{ox}) - Fm(I_F, I_{ox})]\}$, $FM(I_F, I_{ox}) = 0.06$, and $Fm(I_F, I_{ox}) = 0.45$.

For preference:

when $I_{conf} \leq 0.15$, $L' \leq (1/0.9) \times FM(I_F, I_{ox})$, when $0.25 \leq I_{conf}$, $L' \leq (1/0.9) \times Fm(I_F, I_{ox})$, and when $0.15 \leq I_{conf} \leq 0.25$, $L' \leq (1/0.9) \times \{FM(I_F, I_{ox}) - 10 \times (I_{conf} - 0.15) \times [FM(I_F, I_{ox}) - Fm(I_F, I_{ox})]\}$.

Again for preference:

when $I_{conf} \leq 0.15$, $L' \leq FM(I_F, I_{ox})$, when $0.25 \leq I_{conf}$, $L' \leq Fm(I_F, I_{ox})$, and when $0.15 \leq I_{conf} \leq 0.25$, $L' \leq FM(I_F, I_{ox}) - 10 \times (I_{conf} - 0.15) \times [FM(I_F, I_{ox}) - Fm(I_F, I_{ox})]$.

As already mentioned hereinabove, oxycombustion has several advantages over air combustion. The oxygen content of the oxidant, which is greater than or equal to 50 vol %, is preferably greater than or equal to 70 vol % and more preferably still, greater than or equal to 80 vol %, and even more preferably still, greater than or equal to 87 vol %.

According to another particularly beneficial embodiment, the burner is a tube-in-tube burner. This type of burner comprises an injector with a central tube for supplying fuel, this central tube being positioned inside a second tube with an annular passage created to supply the oxidant, said annular passage being situated around the central tube. The fuel then leaves the injector through a central section of the outlet opening of the injector and the oxidant leaves the injector via an annular section situated around the central section in the outlet opening of the injector.

The power of the burner is preferably from 0.1 to 500 kW.

According to a preferred alternative form of the method, the burner comprises means for conferring rotation upon the oxidant and/or upon the fuel as it leaves the injector, the burner preferably being a tube-in-tube burner comprising a drill inside the central tube for the fuel.

In this case, the method may notably implement a burner of the type described in U.S. Pat. No. 6,431,467 in the name of American Air Liquide. This type of burner more particularly comprises:

a first duct for the passage of the oxidant, a second duct, coaxial with the first duct, and positioned inside said first duct for the passage of the fuel, an end piece positioned at the end of the first duct, a nozzle placed at the end of the second duct, a means allowing the oxidant to be made to swirl and positioned on the nozzle placed at the end of the second duct.

Figure 6:
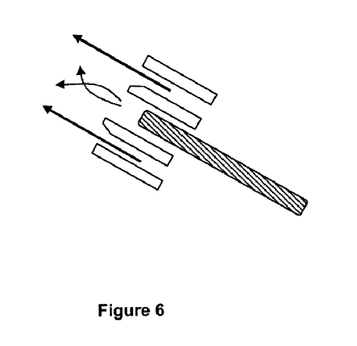
FIG. 6 is a diagram of a tube-in-tube burner injector with the injection of fuel at the center through a drill for creating a rotational movement, the oxidant being injected at the periphery.

According to this alternative form, the means causing the oxidant to swirl may comprise an object of elongate shape centered aerodynamically inside the nozzle of the second duct, the inside diameter of said nozzle being greater than the diameter of the object of elongate shape of the means causing the oxidant to swirl. The object of elongate shape may consist of at least one helicoid rod (drill) over a portion of its length. The injector of such a burner is schematically depicted in FIG. 6.

According to this variant embodiment, the burner may also comprise a means that can cause the oxidant to swirl and that is positioned on the end piece fitted to the end of the first duct; this means that can cause the oxidant to swirl may consist of a helical spring.

This type of burner is particularly suitable because it produces a flame the length of which remains constant irrespective of the variations in power.

The method according to the invention can be used for various applications.

The invention relates notably to the use of the method as defined hereinabove to heat molten material in a distribution canal, and in particular to heat molten glass in a distribution canal for the conditioning of the glass.

In the method according to the invention, the burner may in particular be mounted in a side wall.

The fuel is typically a gaseous fuel, such as natural gas, methane, propane and butane. However, the fuel may equally be a fluidized jet of an (atomized) liquid fuel or of a powdered solid fuel.

The longest length L' of the downstream cone is preferably ≤0.4 m and more preferably still, L'≤0.3 m.

The present invention is illustrated hereinafter by means of a nonlimiting example in the field of glass distribution canals or forehearths.

In a canal through which there flows a fluid that requires an influx of energy in order to heat it, including to maintain its temperature, the characteristics of said fluid (temperature, viscosity, for example) have generally to be controlled. This is the case of glass for example.

The temperature of the glass leaving the melting furnace needs to be controlled before the glass reaches the forming machines so that the glass acquires suitable properties for shaping it, such as the viscosity for example. Distribution canals, also known as "feeders" or "forehearths", are used to carry the glass between the outlet of the melting furnace and the inlet of the forming machines.

These distribution canals have heating systems so that the energy that the glass requires can be supplied throughout its journey. Given that the glass cools mainly at the ends of the distribution canals, through contact with the refractory materials of which the distribution canals are made, it is necessary for the heating energy to be transmitted mainly to the ends of the distribution canals in order to compensate for such losses.

Figure 1:
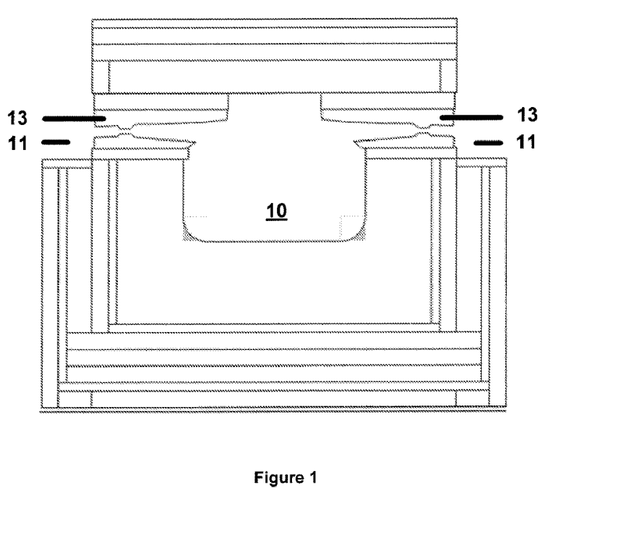
FIG. 1 represents a view in cross section of a glass distribution canal with the positions of the bath of glass and of the blocks.
Figure 2:
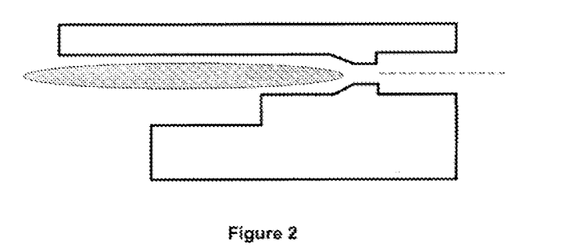
FIG. 2 is a diagram of a port block used in the glass distribution canals, with the position of the tip of the burner and that of the flame.

As illustrated in FIG. 1, the heating systems commonly used in glass distribution canals 10 are burners 11 mounted in the side walls of the canal. The injector of said burners 11 is set back inside a port block 13 (see FIG. 2).

According to the technical characteristics of the method (the temperature of the glass for example), which may differ from one industrial site to another, and according to the number of burners 11 to be used for a given region of canal 10, it may be necessary to use burners of different powers for one and the same given geometry of block.

Thanks to oxycombustion, the flame temperature is higher, the radiative heat transfer is more intense and takes place over a range of wavelengths which may be more propitious to the absorbtivity of the glass; all of these factors contribute to improving the heat transfer between the flame and the glass by comparison with a similar air combustion system.

Correct operation of the glass distribution canals sets a number of criteria regarding the power and shape of the flame.

Hence, if the flame is too short and remains essentially inside the chamber of the block, the glass will be insufficiently heated.

By contrast, if the flame is too long, the hottest zone of the flame then lies beyond the end of the canal (or edge), and the consequence of this is that heat transfer at the edges is lessened.

Another negative effect in the case of a flame that is too long may be interaction of opposing flames, which may result in overheating of and damage to the roof of the canal.

The person skilled in the art will therefore select, for heating the molten glass in the distribution canals, oxyburners that will avoid the abovementioned problems.

However, as explained above, oxycombustion presents problems with the durability and reliability of the block and/or the burner.

The present invention allows the person skilled in the art to create burners, notably tube-in-tube burners, which allow the glass distribution canals to operate correctly and which are durable and reliable, and are so notably as a function of the required power and of the geometry of the block.

As already mentioned, the invention is particularly beneficial in cases of retrofit.

By applying the method according to the invention, the energy transferred to the canal is optimized. Moreover, the temperature level of the block decreases significantly so that it lies below 1500° C., as measured experimentally. Because the thermal stresses applied to the block are reduced, the service life of the block is lengthened.

This state of affairs also holds for long blocks.

In addition to optimizing the heat transfer and decreasing the stresses on the block, the risk of the burner tip overheating and of damage to the burner (blocking of the injectors) or to the block is also reduced.

Specifically, when the impulses of the reagents are adjusted, temperature measurements have shown that the burner tip temperature decreased by 100° C. or more to lie generally below 1150° C. Experimental measurements have demonstrated that the risk of soot formation is generally increased when the temperature of the tip, which is made of steel, exceeds 1150° C.

One remarkable effect of the invention is the reduction in, on the one hand, the radiative heat flux and, on the other hand, the volatile materials both collected in the chamber of the block and originating from the heating zone. Now, as mentioned previously, a significant deposit of volatile substances in the block may cause the flame to deflect if this flame comes into contact with said deposit and especially carries a risk of damaging the block.

When the industrial application entails varying the power of the burner, it is beneficial to use the alternative form of the invention where a drill situated in the fuel injection is used as described in U.S. Pat. No. 6,029,910 "Low firing rate oxyfuel burner" in the name of American Air Liquide, so that the rotating effect of the gas allows the combustion reaction to be kept in the same spatial zone as the burner power varies.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for heating a substance present in a heating zone by burning a fuel with an oxidant by means of a burner comprising an injector positioned inside a block, the block defining an upstream inlet passage and a downstream cone-shaped burner chamber, the inlet passage having an inlet end and an outlet end, the inlet passage opening into the burner chamber via its outlet end, the injector being mounted in the inlet passage as far as the outlet end of the inlet passage directly upstream of the chamber, characterized in that:

the oxidant has an oxygen content ≥50 vol %, the chamber has a confinement index $I_{conf} \geq 0.10$ with $I_{conf} = (S/S') \times (L/L') \times (1/(1+\alpha/100))$, L' being the longest length of the downstream cone in m, L being the shortest length of the downstream cone in m, S being the smallest cross section of the downstream cone in $m^2$, S being the cross section of the downstream cone at its shortest length L in $m^2$, and α being the cone angle of the downstream cone, α ranges from 1° to 16°, the fuel is injected by the injector into the burner chamber with an impulse force $I_F$ at the outlet of the injector and the oxidant is injected by the injector into the chamber of the burner with an impulse force $I_{ox}$ at the output of the injector such that 0.7 mN≤$I_F$≤3.6 mN and 0.3 mN≤$I_{ox}$≤5.1 mN, provided that when $I_{ox}$>3.8 mN then $I_F$≤3.3 mN.

2. The method of heating of claim 1, wherein $I_F$≥1.8.

3. The method of heating of claim 1, wherein 2.3≤$I_F$≤3.3 and 1.8≤$I_{ox}$≤3.8.

4. The method of claim 1, wherein $I_{conf}$≤0.35.

5. The method of claim 1, wherein:
FM($I_F$, $I_{ox}$)=0.6,
Fm($I_F$, $I_{ox}$)=0.45,
when $I_{conf}$≤0.15, L'≤(1/0.8)×FM($I_F$, $I_{ox}$),
when 0.25≤$I_{conf}$, L'≤(1/0.8)×Fm($I_F$, $I_{ox}$), and
when 0.15<$I_{conf}$<0.25, L'≤(1/0.8)×{FM($I_F$, $I_{ox}$)−10×($I_{conf}$−0.15)×[FM($I_F$, $I_{ox}$)−Fm($I_F$, $I_{ox}$)]}.

6. The method of claim 4, wherein:
when $I_{conf}$≤0.15, L'≤(1/0.9)×FM($I_F$, $I_{ox}$)
when 0.25≤$I_{conf}$, L'≤(1/0.9)×Fm($I_F$, $I_{ox}$), and
when 0.15<$I_{conf}$<0.25, L'≤(1/0.9)×{FM($I_F$, $I_{ox}$)−10×($I_{conf}$−0.15)×[FM($I_F$, $I_{ox}$)−Fm($I_F$, $I_{ox}$)]}.

7. The method of claim 5, wherein:
when $I_{conf}$≤0.15, L'≤FM($I_F$, $I_{ox}$),
when 0.25≤$I_{conf}$, L'≤Fm($I_F$, $I_{ox}$), and
when 0.15<$I_{conf}$<0.25, L'≤FM($I_F$, $I_{ox}$)−10×($I_{conf}$−0.15)×[FM($I_F$, $I_{ox}$)−Fm($I_F$, $I_{ox}$)].

8. The method of claim 7, wherein the oxygen content of the oxidant is greater than or equal to 70 vol %

9. The method of claim 1, wherein the burner is a tube-in-tube burner.

10. The method of claim 1, wherein the burner has a power of 0.1 to 500 kW.

11. The method of claim 1, wherein the burner comprises means for causing the oxidant and/or the fuel to rotate as it leaves the injector.

12. The method of claim 1, wherein the substance to be heated is molten matter, preferably molten glass.

13. The method of claim 12, wherein the heating zone is situated inside a distribution canal, and preferably inside a glass distribution canal or forehearth.

14. The method of claim 1, wherein the fuel is a gaseous fuel, chosen from natural gas, methane, propane and butane.

15. The method of claim 1, wherein L'≤0.4 m.

16. The method of claim 7, wherein the oxygen content of the oxidant is greater than or equal to 80 vol %.

17. The method of claim 7, wherein the oxygen content of the oxidant is greater than or equal to 87 vol %.

18. The method of claim 1, wherein L'≤0.3 m.

* * * * *